Patented Feb. 9, 1932

1,844,663

UNITED STATES PATENT OFFICE

WALTER KIRCHNER, OF GRUNAU-BERLIN, GERMANY, ASSIGNOR TO CHEMISCHE FABRIK GRUNAU LANDSHOFF & MEYER AKTIENGESELLSCHAFT, OF GRUNAU-BERLIN, GERMANY

PROCESS OF RENDERING CEMENT, MORTAR, AND CONCRETE WATERTIGHT

No Drawing. Application filed November 11, 1930, Serial No. 494,920, and in Germany November 13, 1926.

My invention relates to a process of rendering cement watertight.

It is well known in the art of rendering cement mortar and concrete watertight or waterproof to employ combinations and mixtures which consist mainly of grease or bitumen containing products. Although the water rejecting action of these substances is readily admitted, certain disadvantages arise in their application. It has been ascertained that almost all bodies which contain organic fats as such or in the form of salts adversely affect the cement, probably because their nature is so entirely different.

It has now been ascertained that diluted aqueous solutions of the hydrates of alkali aluminates by themselves or in mixture with other substances are extraordinary effective watertightening agents for cement. If, for instance, plates or slabs of mortar of about one inch thickness are manufactured from 1 part by weight of cement and 4 parts by weight of granular building sand after mixing with water, such plates prove even after lengthy storage when subjected to tests for watertightness that the water percolates or seeps through vigorously at low pressure. If, however, instead of the mixing water for the manufacture of such plates of mortar aqueous solutions of hydrates of alkali aluminates, for instance hydrates of sodium or potassium aluminates or mixtures of various hydrates of alkali aluminates are used in such a proportion that 1.5 kg. of the dissolved substance is added to 100 kg. of Portland cement, the plates or slabs of mortar produced under otherwise exactly similar conditions prove perfectly watertight even at high water pressures.

It is by no means easy to give a plausible explanation for this somewhat surprising fact. It may be assumed that part of the tightening effect is traceable to the precipitation of hydrate of alumina in the state of finest distribution in the pores of the mortar during the setting.

Under the term "hydrates of alkali aluminates" in the sense of the present invention is to be understood a combination in which a radical of aluminium and oxygen atoms appears as anion, while in the salts of aluminium the aluminium exists as cation. In a chemical sense the cation $Al^{+++}$ is an entirely different substance from the anion $AlO_3^{---}$, and researches about the addition of cation $Al^{+++}$ to the mixing water of cement permit of no conclusion about the addition of the anion $AlO_3^{---}$. There exist no publications about the action of the hydrates of alkali aluminates on cement in regard to the increase of the watertightness.

Such hydrates of alkali aluminates form when hydrates of alumina are dissolved in aqueous solutions of the alkali hydroxides, in contrast to the ordinary anhydrous combinations of alumina with the bases of the alkali and earthy alkali group, usually designated "aluminates".

Compared with the anhydrous alkali aluminates the hydrates of alkali aluminates also possess the important property that they are extraordinary easily subject to hydrolysis without substantially flaking out. They are decomposed partly into free alkali and free hydroxide of alumina which latter is peptized by the alkali and which thereby is kept in solution in partly colloidal form. Such a stable but easily hydrolysable solution of alkali aluminates of certain alkali metals or mixtures of the same is employed for mixing the cement. The mixture of hydrates of sodium aluminates with hydrates of potassuim aluminates and also pure hydrates of potassium aluminates have proved of great utility in practical use. The hydrate of sodium aluminate disassociates under certain conditions into hydrate of alumina and hydrate of sodium. The hydrate of sodium is on exposure to the air gradually converted into sodium carbonate which under the action of humidity is able to form crystallized sodium carbonate with 10 molecules of water. This involves the risk that in building structures which were constructed with hydrates of sodium aluminates and temporarily exposed to the atmosphere or the carbonic acid of the air respectively, crystallized soda might be formed in the interior of the structures which might impair the solidity and strength of the structure. This drawback does not arise when hydrates of potassium aluminates are employed, because potassium carbonate does not appear to form hydrates with water which due to their strong increase in volume have a driving or expanding action.

When employing mixtures of hydrates of sodium and potassium aluminates this driving action becomes less pronounced.

The value of the present invention also resides in the fact that the hereinbefore described precipitation of the alumina in the pores consists of a uniform inorganic material akin to cement so that a subsequent change of the cement, as in the case of oils, fats and bitumen need not be feared.

I claim as my invention:—

1. The process of rendering cement mortar, concrete and building structures constructed with these materials, watertight, which comprises mixing the mortar or concrete with an aqueous solution of hydrates of alkali aluminates.

2. The process of rendering cement mortar concrete and building structures constructed with these materials, watertight, which comprises mixing one of said material with a solution of a mixture of hydrates of various alkali metal aluminates.

3. The process of rendering cement mortar concrete and building structures constructed with these materials, watertight, which comprises adding an aqueous solution of hydrate of potassium aluminate to one of said materials.

4. The process of rendering cement mortar concrete and building structures constructed with these materials, watertight, which comprises employing such hydrates of alkali aluminates for the mixing of the mortar which on hydrolysis decompose into free alkali and free hydrates of aluminium.

5. The process of rendering building material comprising cement, watertight and waterproof which comprises mixing the cement with an aqueous solution of a hydrate of an alkali metal aluminate and causing the mixture to set.

6. The process of rendering building material comprising cement watertight and waterproof which comprises mixing about 100 parts of cement with an aqueous solution containing about 1.5 parts of a hydrate of an alkali metal aluminate and causing the mixture to set.

7. A new waterproof, watertight, cementitious composition comprising a mixture of cement and an aqueous solution of an hydrate of an alkali aluminate.

8. A new waterproof, watertight, cement mortar composition comprising a mixture of cement mortar and an aqueous solution of hydrates of alkali aluminates.

9. A new waterproof, watertight, cement mortar composition comprising cement mortar and an aqueous solution of hydrates of different alkali aluminates.

10. A new waterproof, watertight, cement mortar composition comprising cement mortar and an aqueous solution of alkali aluminates which hydrolyze to free alkali and free hydrates of aluminum.

11. A new waterproof, watertight, cementitious building material comprising a mixture of cement and an aqueous solution of a hydrate of potassium aluminate.

12. A composition as defined in claim 11 wherein about 100 parts of cement are employed with about each 1.5 parts of the hydrate of potassium aluminate.

In testimony whereof I affix my signature.

WALTER KIRCHNER.